United States Patent [19]
Asanuma

[11] Patent Number: 5,983,113
[45] Date of Patent: Nov. 9, 1999

[54] CDMA COMMUNICATION SYSTEM USING ORTHOGONAL CODE

[75] Inventor: Yutaka Asanuma, Tokyo, Japan

[73] Assignee: Kabushiki Kaisha Toshiba, Kawasaki, Japan

[21] Appl. No.: 08/878,123

[22] Filed: Jun. 18, 1997

[30] Foreign Application Priority Data

Jun. 19, 1996 [JP] Japan .................................. 8-158385

[51] Int. Cl.⁶ .................................................. H04B 1/00
[52] U.S. Cl. .......................................... 455/506; 455/502
[58] Field of Search .................................... 370/320, 335, 370/342, 441, 516, 517; 445/10, 67.6, 502, 504, 505, 506, 517; 375/200–210

[56] References Cited

U.S. PATENT DOCUMENTS

| | | | |
|---|---|---|---|
| 5,095,535 | 3/1992 | Freeburg ................................... | 455/65 |
| 5,103,459 | 4/1992 | Gilhousen et al. ....................... | 370/335 |
| 5,235,615 | 8/1993 | Omura ...................................... | 370/342 |
| 5,237,587 | 8/1993 | Schoolcraft ............................. | 375/208 |
| 5,499,236 | 3/1996 | Giallorenzi et al. ..................... | 370/441 |
| 5,539,749 | 7/1996 | Eul ........................................... | 455/422 |
| 5,550,811 | 8/1996 | Kaku et al. .............................. | 370/342 |
| 5,583,853 | 3/1996 | Giallorenzi et al. ..................... | 370/441 |
| 5,617,410 | 4/1997 | Matsumoto ............................. | 370/342 |
| 5,696,766 | 12/1997 | Yeung et al. ............................ | 370/515 |
| 5,835,489 | 11/1998 | Moriya et al. .......................... | 370/342 |

*Primary Examiner*—Nguyen Vo
*Assistant Examiner*—Makoto Aoki
*Attorney, Agent, or Firm*—Oblon, Spivak, McClelland, Maier & Neustadt, P.C.

[57] ABSTRACT

With a CDMA mobile communication system of the present invention, the phase difference sensing circuit of the base station senses the phase difference with respect to a reference phase from the cross-correlation value of the up-link channel signals coming from mobile stations and sends timing control information for compensating the phase difference closer to zero to the mobile stations. Then, in each of the mobile stations, the transmission timing control circuit variably sets the amount of delay in the delay circuit of the modulation circuit according to the timing control information sent from the base station. This enables the transmission timing of the transmission signal of each of the mobile stations to undergo delay control, maintaining the orthogonality between the individual up-link channel signals at the base station.

14 Claims, 12 Drawing Sheets

CHARACTERISTIC OF NO. OF MULTIPLE
CHANNELS VS. CODE ERROR RATE(CASE 1)

CHARACTERISTIC OF NO. OF MULTIPLE
CHANNELS VS. CODE ERROR RATE (CASE 2)

| PROPAGATION ENVIRONMENT | TPC:Case1 | | TPC:Case2 | |
|---|---|---|---|---|
| | WITH TA | WITHOUT TA | WITH TA | WITHOUT TA |
| a) EQUAL GAIN 2 PASS | 22 ch | 10 ch | 41 ch | 19 ch |
| b) EQUAL GAIN 3 PASS | 19 | 12 | 29 | 19 |
| c) EQUAL GAIN 4 PASS | 19 | 14 | 25 | 19 |

FIG. 10

| COMMUNICATION METHOD | DS-CDMA(PG=64) |
|---|---|
| PRIMARY MODULATION METHOD | QPSK |
| RECEPTION METHOD | RAKE+SYNCHRONOUS DETECTION |
| WAVEFORM SHAPING FILTER | ROOT NYQUIST FILTER (a=0.3) |
| SPREAD CODE  Short Code  Long Code | ORTHOGONAL GOLD CODE 64 CHIP  PN CODE 153600 CHIP  WITH TA:COMMON  WITHOUT TA:DIFFERENT CODE PER PS |
| TRANSMISSION POWER CONTROL | COMPENSATION FOR DISTANCE VARIATIONS & SHADOWING VARIATIONS (CASE 1) |
| PROPAGATION MODEL | EQUAL GAIN 2 PASS RAYLEIGH MODEL  RELATIVE DELAY 1-10 CHIPS  (DIFFERS CHANNEL BY CHANNEL) |
| TIME ALIGNMENT ERROR | 0,0.25,0.5,0.75,1,1.5,2,3,5 |

FIG. 11

CHARACTERISTIC OF NO. OF MULTIPLE CHANNELS-BAR
(COMPARISON OF ANALYSIS RESULT WITH SIMULATION RESULT)

CHARACTERISTIC OF NO. OF MULTIPLE CHANNELS-BAR
(CAPACITY DECREASED BY TA ERROR x)

CDMA COMMUNICATION SYSTEM USING ORTHOGONAL CODE

BACKGROUND OF THE INVENTION

This invention relates to a digital mobile communication system, such as a Vehicular telephone system, a portable telephone system, a cordless telephone system, a radio LAN system, and more particularly to a system using a Code Division Multiple Accessing (CDMA) method as a radio accessing scheme between a base station and mobile stations.

In recent years, a spread spectrum communication system, which has good tolerance resistance to interference and jamming disturbance, has attracted attention as one of the communication scheme suitable for the mobile communication system.

In the radio communication system using the spread spectrum communication system, data is transmitted as follows, for example. The equipment on the transmission side first modulates the digitized audio data and video data by a digital modulation scheme, such as the PSK or FSK modulation scheme. Next, the modulated transmission data is converted into a wide-band base-band signal using spread code, such as pseudorandom noise code (PN code). Then, the spread transmission signal is converted into a radio-frequency signal, which is transmitted. The equipment device on the reception side performs an inverse spread operation using the same code as the spread code used in the transmission-side equipment. Then, the inverse spread reception signal is demodulated in a digital demodulation scheme, such as the PSK or FSK demodulation scheme to reproduce the data.

As a radio accessing scheme in this type of system, a Code Division Multiple Accessing (CDMA) method has been used which enables a plurality of mobile stations to communicate in the same frequency band simultaneously by allocating a different spread code to each mobile station.

In the CDMA mobile communication system, interference between channels limits the system capacity. To increase the system capacity, it is important to suppress interference between channels. Various interference suppressing techniques have been developed. One of them is to orthogonalize channels mutually by codes or spaces. In orthogonalizing channels by codes, use of orthogonal codes for which the cross-correlation value between codes is zero is effective. Orthogonal codes of this type include the Walsh code and the orthogonal Gold code.

With the orthogonal code, however, when the phase between channels is shifted, the cross-correlation value is not zero. Therefore, to suppress interference between channels using orthogonal codes, it is necessary to force the phases of orthogonal codes to synchronize each other. Generally, in a down-link channel transmitting signal from the base station to each mobile station, the transmission phase of each down-link channel signal is the same when the base station transmitted the signal. Since all of the down-link channel signals reach the corresponding mobile stations by way of the same transmission path, the cross-correlation value of the orthogonal codes between the individual down-link channel signals received at the respective mobile stations is zero as shown in FIG. 15. Therefore, it is possible to suppress interference between channels and achieve high-quality transmission.

In contrast, in an up-link channel transmitting signal from each mobile station to the base station, the distance between each mobile station and the base station, that is, the propagation delay time of an up-link channel signal transmitted from each mobile station to the base station, differs depending on the location of each mobile station. As a result, even if each mobile station transmits an up-link channel signal with the same phase, the reception timing of each up-link channel signal at the base station will differ from each other as shown in FIG. 16. Then, the cross-correlation value of the orthogonal codes between the up-link channel signals is not zero. Consequently, the interference between the up-link channels occurs, and, the system capacity doesn't increase.

BRIEF SUMMARY OF THE INVENTION

The object of the present invention is to provide a CDMA communication system that enables high-quality radio communication with less interference between channels by maintaining the orthogonality of orthogonal codes between up-link channel signals and thereby increases the channel capacity.

To accomplish the forgoing object, a CDMA communication system of the present invention is such that a base station senses the phase difference between the orthogonal codes of the up-link channel signals coming from a plurality of mobile stations and creates timing control information for controlling the sensed phase difference closer to zero and notifies the timing control information to the relevant mobile station, and each of the plurality of mobile stations receives the timing control information notified by the base station and controls the transmission timing of an up-link channel signal transmitted to the base station according to the received timing control information.

A radio communication apparatus of the present invention used as a base station, comprises: sensing means for sensing the phase difference between the orthogonal codes of the individual up-link channel signals coming from a plurality of mobile stations; and timing information notifying means for creating timing control information for controlling the phase difference sensed by the sensing means closer to zero and notifying the timing control information to the relevant mobile station to force the mobile station to control the transmission timing of the up-link channel signal on the basis of the timing control information.

A radio communication equipment of the present invention used as a mobile station, comprises transmission timing control means for controlling the transmission timing of an up-link channel signal so that the reception phase of the up-link channel signal at a base station may synchronize with the reception phase at the base station of the up-link channel signal transmitted from another mobile station.

Therefore, with the present invention, the base station senses the phase difference between the orthogonal codes of the up-link channel signals received from the individual mobile stations, creates timing control information for controlling the phase difference closer to zero, and notifies the timing control information to the mobile stations. On the basis of the timing control information notified by the base station, each mobile station adjusts the transmission timing of an up-link channel signal. This enables the up-link channel signals transmitted from the individual mobile stations to be received by the base station simultaneously, even when the distance from the base station to each mobile station differs. Accordingly, when orthogonal codes are used as spread codes for the up-link channel signals, the correlation value between orthogonal codes at the base station can be made zero, which achieves high-quality radio communication with less interference between channels. Consequently, the channel capacity can be increased.

Furthermore, the base station senses the phase difference and notifies the timing control information to a mobile station in a period of negotiation made to establish a radio link with the mobile station before the start of communication, and each of the plurality of mobile stations performs delay control of the transmission timing of an up-link channel signal on the basis of the timing control information notified by the base station in the negotiation period. By doing this, high-quality radio communication without interference between channels can be started from the start time of communication.

Moreover, the base station senses the phase difference and notifies the timing control information to a mobile station during a communication period, and each of the plurality of mobile stations performs delay control of the transmission timing of an up-link channel signal during the communication period on the basis of the timing control information notified by the base station. By doing this, the reception phases of the individual up-link channel signals at the base station can be forced to always synchronize with each other, even when the distance from the base station varies with the movement of the mobile stations during the communication. As a result, high-quality communication without interference between channels can be provided without intermission during the communication.

Furthermore, when delay spread has occurred on the up-link channel going from each of the mobile stations to the base station, the sensing means at the base station selects the path where the reception level is the largest from the plurality of paths for each up-link channel signal and then senses the phase difference between the selected paths. Then, timing control information for controlling the phase difference closer to zero is created and then is notified to the relevant mobile station. On the basis of the timing control information, the mobile station performs delay control of the transmission timing of an up-link channel signal.

By doing this, the orthogonality between the paths that have the greatest effect on interference between channels, even when delay spread has occurred on the channel from each of the mobile stations to the base station. This enables interference between channels to be suppressed effectively.

Moreover, in selecting the path where the reception level is the largest from the plurality of paths, the one for which the time average value of the reception levels is the largest should be selected. Specifically, when the moving speed of a mobile station is fast, the effect of fading causes the reception level at each path to fluctuate significantly. As a result, there is a possibility that even if the path with the largest reception level is selected with a certain timing, the reception level at another path will be larger as time passes, preventing stable timing control. To overcome this problem, as in the present invention, the time average value of the reception levels is found for each path and the path with the largest time average value is selected, which enables stable timing control.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a table listing the number of multiple channels with $BER=3\times10^{-2}$ in FIGS. 8 and 9;

FIG. 11 is a table listing simulation conditions for evaluating the time alignment method of the present invention;

DETAILED DESCRIPTION OF THE INVENTION

Figure 1:
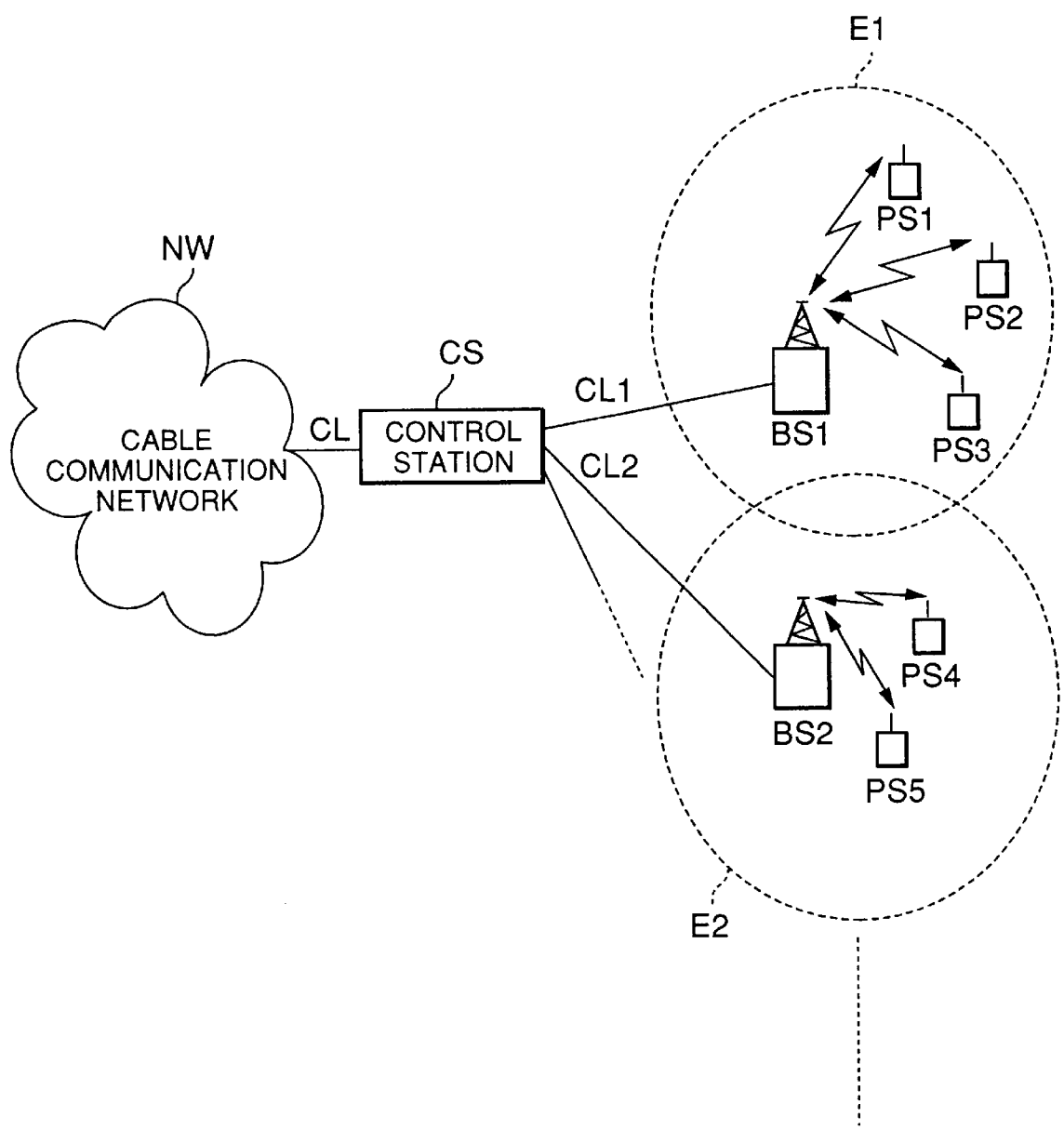
FIG. 1 shows a schematic configuration of an embodiment of a mobile communication system according to the present invention.

FIG. 1 shows a schematic configuration of an embodiment of a CDMA mobile communication system according to the present invention.

The system comprises a control station CS, a plurality of base stations BS1, BS2, . . . , and a plurality of mobile stations PS1, PS2, . . . The control station CS is connected to a cable communications network NW via a cable line CL. The base stations BS1, BS2, . . . are connected to the control station CS via cable lines CL1, CL2, . . . , respectively. The base stations BS1, BS2, . . . form radio zones E1, E2, . . . , respectively. Each radio zone is called a cell.

The base stations BS1, BS2, . . . access the mobile stations existing in their own radio zones E1, E1, . . . by the CDMA scheme, using the radio frequency allocated to each of the base stations. In the CDMA communication, long codes and short codes are used as spread codes. For long codes, for example, 153600-chip PN codes are used. For short codes, for example, 64-chip orthogonal gold codes are used.

Figure 2:
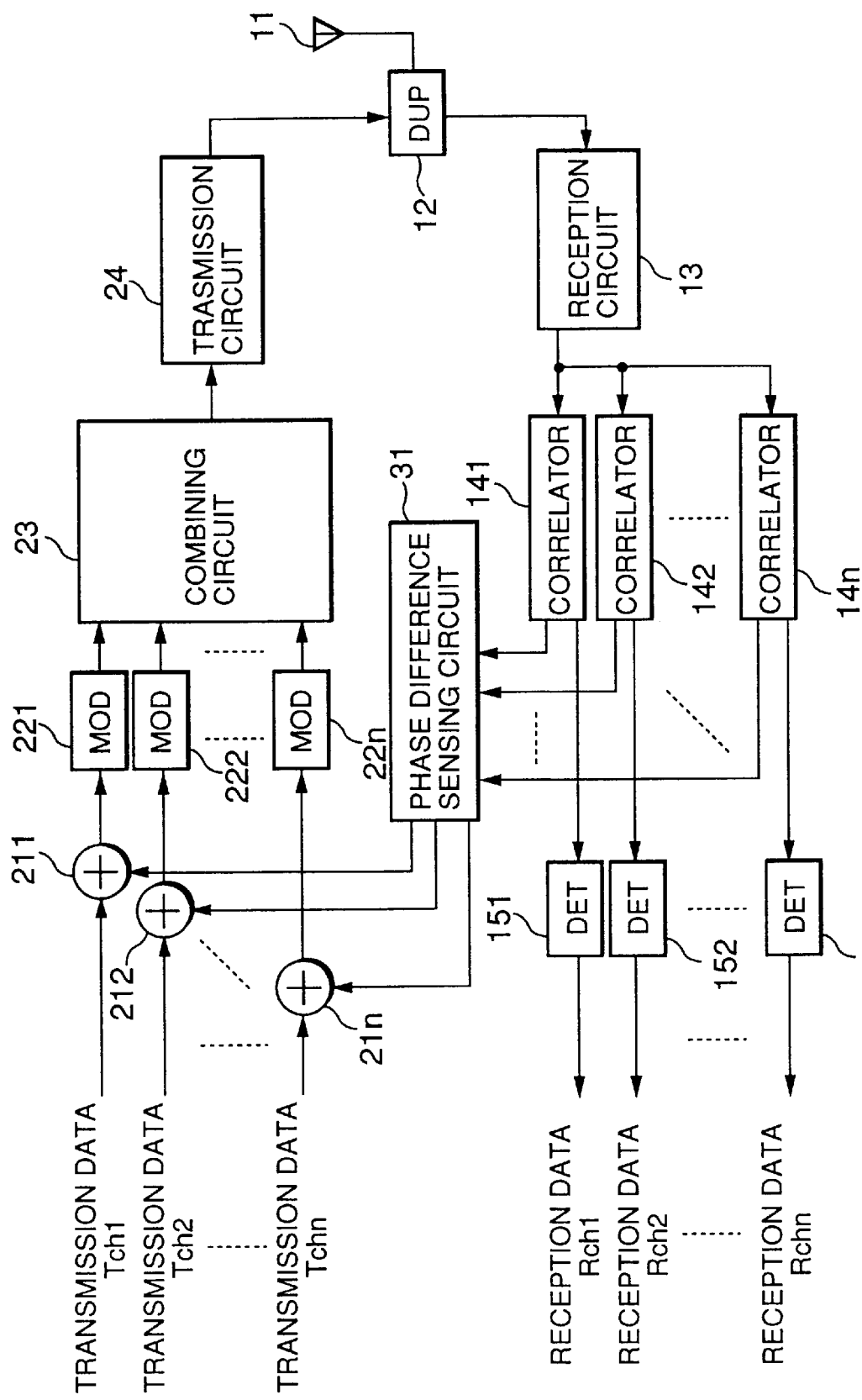
FIG. 2 is a circuit block diagram of the essential part of a base station.

The base stations BS1, BS2, . . . are each constructed as follows. FIG. 2 is a circuit block diagram of the essential part of a base station.

In FIG. 2, the transmission data items Tch1, Tch2, . . . , Tch$n$ for n channels outputted from a codec (not shown) are inputted to modulators (MOD) 221 to 22$n$ via adders 211 to 21$n$, respectively. In the modulators 221 to 22$n$, the transmission data items Tch1, Tch2, . . . , Tch$n$ are subjected to a primary modulation, such as QPSK, and a spectrum spread modulation using the spread code unique to each channel. As spread codes, PN codes and orthogonal codes are used as described earlier. The spread modulated signals outputted from the modulators 221 to 22$n$ are combined into a single signal at a combining circuit 23. The resulting signal is inputted to a transmission circuit 24. The transmission circuit 24 up-converts the spread modulated signal into a radio-frequency signal and amplifies it to a specific transmission power level. The transmission radio frequency signal outputted from the transmission circuit 24 is supplied to an antenna 11 via an antenna duplexer (DUP) 12. The antenna 11 transmits the signal to the individual mobile stations PS1 to PS$n$.

In contrast, the up-link radio-frequency signals coming from the individual mobile stations PS1 to PS$n$ are received by the antenna 11 and then are inputted to the reception circuit 13 via the antenna duplexer 12. The reception circuit 13 amplifies the received radio-frequency signal at high frequencies and then down-converts the amplified signal into an intermediate frequency signal. The reception intermediated frequency signal outputted from the reception circuit 13 is branched into sub-signals for n routes (channels), which are inputted to correlators 141 to 14$n$, respectively. The correlators 141 to 14$n$ perform a spectrum inverse spread process on the reception intermediate frequency signal using the PN code and orthogonal code preset for each channel. The reception baseband signals after the inverse spread process are inputted to detectors (DET) 151 to 15$n$. The detectors 151 to 15$n$ detect the reception baseband signals to produce reception data items Rch1, Rch2, . . . , Rch$n$, which are then inputted to a codec (not shown). In the codec, a deinterleaving process, an error correction decoding process, or an audio decoding process is carried out.

When subjecting the reception baseband signal to spectrum inverse spread, the correlators 141 to 14$n$ find the correlation between the reception orthogonal codes included in the reception intermediate signal and the orthogonal codes generated at the base station and input the resulting correlation values to a phase difference sensing circuit 31. The phase difference sensing circuit 31 senses the phase difference between the orthogonal code generated at the base station and the reception orthogonal code for each channel on the basis of the correlation values inputted from the correlators 141 to 14$n$. Then, timing control information for making the sensed phase difference zero is created for each channel. The timing control information is inputted to the adders 211 to 21$n$ in the transmission route. The adders 211 to 21$n$ insert the timing control information in the control field or the spare field in the transmission data having a specific format. As a result, the timing control information for each channel is transmitted together with the transmission data to the corresponding mobile stations PS1, PS2, . . .

Figure 3:
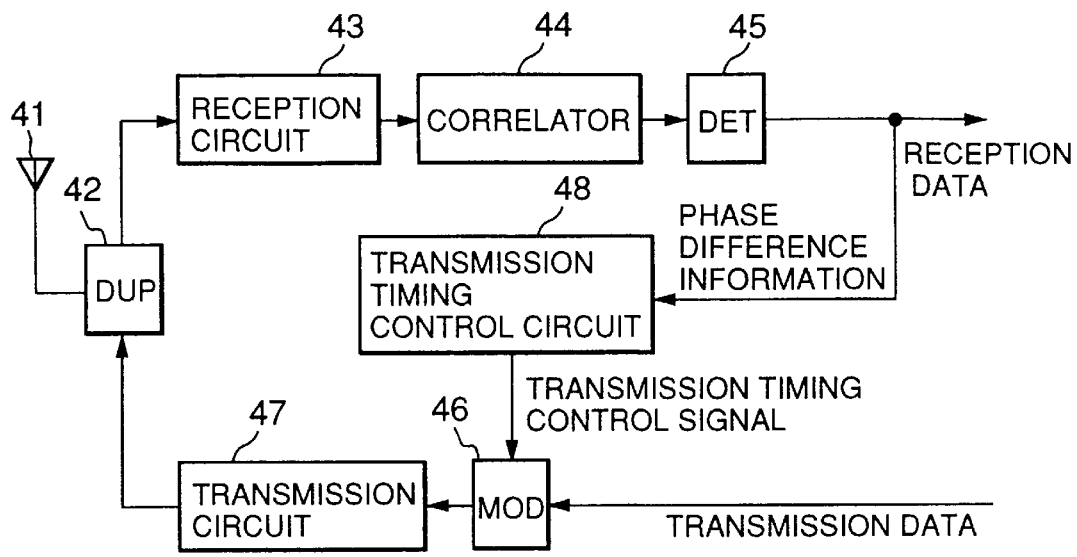
FIG. 3 is a circuit block diagram of the essential part of a mobile station.

On the other hand, the mobile stations PS1, PS2, . . . are each constructed as follows. FIG. 3 is a circuit block diagram of the essential part of a mobile station.

In FIG. 3, the radio-frequency signal coming from the base station BS1 or BS2 is received by an antenna 41 and then is inputted to a reception circuit 43 via an antenna duplexer (DUP) 42. The reception circuit 43 amplifies the received radio-frequency signal at high frequencies and then down-converts the amplified signal into an intermediate frequency signal. The reception intermediated frequency signal outputted from the reception circuit 43 is inputted to a correlator 44. The correlator 44 perform a spectrum inverse spread process on the reception intermediate frequency signal using the PN code and orthogonal code that the base station has allocated to its own mobile station before communication. The reception baseband signal after the inverse spread process is inputted to a detector (DET) 45. The detector 45 detects the reception signal by a detecting method corresponding to the QPSK modulation scheme and inputs the thus-obtained reception data to a codec (not shown).

In contrast, the transmission data outputted from a codec (not shown) is inputted to a modulator (MOD) 46. The modulator 46 first performs a primary modulation on the transmission data by the QPSK method or the like. Then, the transmission data after the primary modulation is subjected to spectrum spread modulation (secondary modulation) using the PN code and orthogonal code that the base station has allocated to its own mobile station before communication. The transmission signal outputted from the modulator 46 is inputted to a transmission circuit 47. The transmission circuit 47 up-converts the transmission signal into a radio-frequency signal and amplifies it to a specific transmission power level. The transmission radio frequency signal outputted from the transmission circuit 47 is supplied to the antenna 41 via the antenna duplexer 42. The antenna 41 transmits the signal to the base station BS1 or BS2.

In the control field or spare field in the reception data outputted from the detector 45, the timing control information has been inserted. The timing control information is inputted to a transmission timing control circuit 48. The transmission timing control circuit 48 generates a transmission timing control signal for specifying a transmission delay time on the basis of the timing control information and supplies it to the modulator 46. The modulator 46 has a delay circuit for controlling the delay of the transmission timing of a spread modulated signal. The amount of delay for the delay circuit is set by the transmission timing control signal. Therefore, after the transmission timing of the transmission signal is controlled by the delay circuit, the transmission signal is transmitted from the transmission circuit 47 to the base station.

Next, the operation of the thus constructed system will be described. Taking a case where the mobile stations PS1, PS2, and PS3 communicate by radio with the base station BS1 in radio zone E1 as shown in FIG. 1, explanation will be given.

When an originating call or a terminating call related to the mobile stations PS1 to PS3 is generated, for example, a pilot signal is exchanged between the mobile stations PS1 to PS3 and the base station before the start of communication, which triggers a synchronization establishing operation. At this time, the base station BS1 allocates a channel to each of the mobile stations PS1 to PS3 by the CDMA scheme. Namely, the phase offset of each of PN codes and orthogonal codes is specified. As a result, for example, channels ch1, ch2, and ch3 are allocated to the mobile stations PS1, PS2, and PS3, respectively.

The base station BS1 senses the phase difference between the reception phase of the orthogonal code included in the pilot signal coming from the individual mobile stations PS1 to PS3 and the orthogonal code generated at the base station. On the basis of the sense result of the phase difference, initial timing control information is created. The initial timing control information is transmitted to the corresponding mobile stations PS1 to PS3 via down-link channels. When receiving the initial timing control information from the base station BS1, each of the mobile stations PS1 to PS3 sets the amount of delay in the delay circuit of the modulation circuit 46 on the basis of the control information to prepare for the start of communication.

After the preparation of communication has been made, from this time on, CDMA communication is started between the individual mobile stations PS1 to PS3 and the base station BS1, using the PN codes and orthogonal codes allocated to the mobile stations.

Figures 5A, 5B:
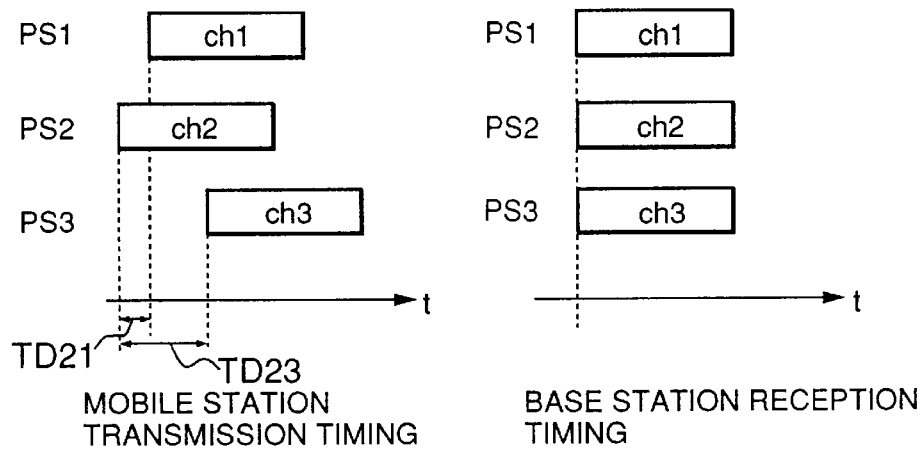
FIG. 5A shows the up-link channel signal transmission timing of the mobile station in the embodiment of the present invention.
FIG. 5B shows the up-link channel signal reception timing of the base station in the embodiment of the present invention.

Specifically, in each of the mobile stations PS1 to PS3, the modulation circuit 46 provides delay control of the transmission timing of the transmission signal, which enables each of the mobile stations PS1 to PS3 to start transmission with a different timing. For example, as shown in FIG. 5A, first the mobile station PS2 starts transmission. At a point in time TD21 later than the transmission start time of the mobile station PS2, the mobile station PS1 starts transmission. At a point in time TD23 later than the transmission start time, the mobile station PS3 starts transmission.

The amount of delay of the transmission timing of the transmission signal has been set already by the initial timing control information coming from the base station BS1 so that the correlation value of the up-link channel signal transmitted from each of the mobile stations PS1 to PS3 may be zero at the base station BS1. This enables each of the up-link channel signals transmitted from the mobile stations PS1 to PS3 to be received at the base station BS1 in the state where no phase difference takes place between the orthogonal codes at the base station BS1 as shown in FIG. 5B. Consequently, no inter-channel interference occurs between the up-link channel signals transmitted from the mobile stations PS1 to PS3, which enables high-quality CDMA communication between the mobile stations PS1 to PS3 and the base station BS1 from the communication start time.

Figures 6A, 6B:
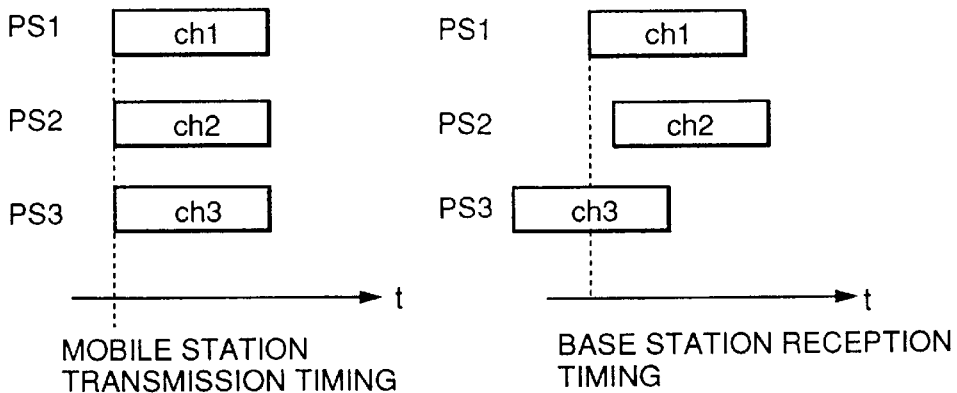
FIG. 6A shows the up-link channel signal transmission timing of a mobile station in the prior art.
FIG. 6B shows the up-link channel signal reception timing of a base station in the prior art.

When the mobile stations PS1 to PS3 communicate simultaneously as shown in FIG. 6A without delay control of transmission timing, the up-link channel signals transmitted from the mobile stations PS1 to PS3 differ in reception timing at the base station BS1 as shown in FIG. 6B. This prevents the orthogonality between the orthogonal codes of the individual up-link channel signals, with the result that the occurrence of inter-channel interference is unavoidable.

Figure 4:
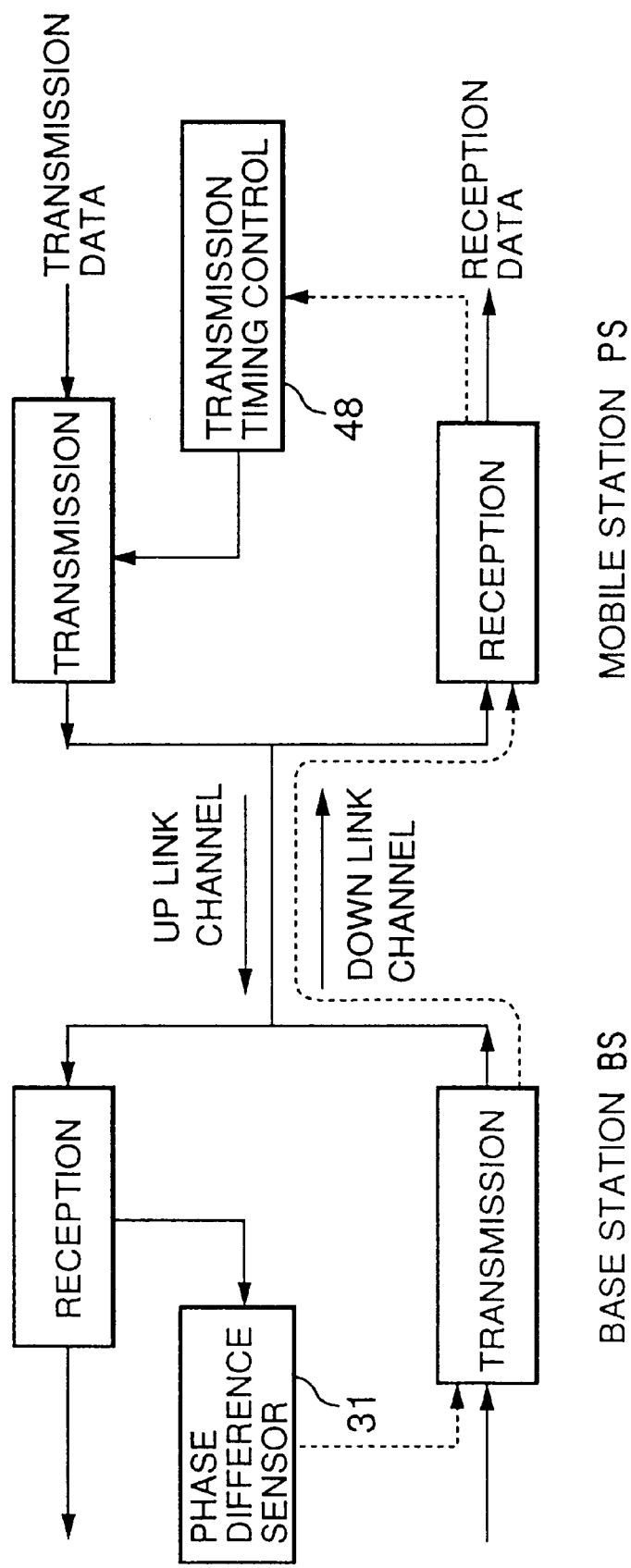
FIG. 4 shows a time alignment control loop formed between the base station and a mobile station.

During the communication, at the base station BS1, the phase difference between the orthogonal codes included in the individual up-link channel signals coming from the mobile stations PS1 to PS3 and the reference phase is always monitored. The timing control information for making the phase difference zero is notified to the mobile stations PS1 to PS3 via down-link channels. This enables variable control of the transmission timing of the mobile stations PS1 to PS3. Specifically, a time alignment control loop for providing feedback control of the transmission timing of the up-link channel signal is formed between the base station BS1 and each of the mobile stations PS1 to PS3, as shown in FIG. 4.

Therefore, even when the mobile stations PS1 to PS3 have moved during communication and the distance between the base station BS1 and the mobile stations PS1 to PS3 has changed and consequently the propagation delay time of the up-link channel has changed, the transmission timing of each of the mobile stations PS1 to PS3 controlled so as to follow the change. This enables the reception phase at the base station BS1 of the up-link channel signal coming from each of the mobile stations PS1 to PS3 to be maintained so that the phase difference may be always the smallest.

Furthermore, there may be a case where each of the up-link channel signals arrived at the base station BS1 from each of the mobile stations PS1 to PS3 has delay spread because of multi-path propagations. In this case, the base station BS1 selects the path with the largest reception level for each up-link channel from the paths resulting from delay spread. The selection of the path with the largest reception level can be realized by using RAKE reception. Then, the phase difference between the reception orthogonal code of the selected path with the largest reception level and the orthogonal code generated at the base station is sensed. Then, the timing control information for compensating the phase difference closer to zero is notified to the corresponding mobile stations PS1 to PS3, which causes the mobile stations PS1 to PS3 to perform delay control of the transmission timing.

Figure 7:
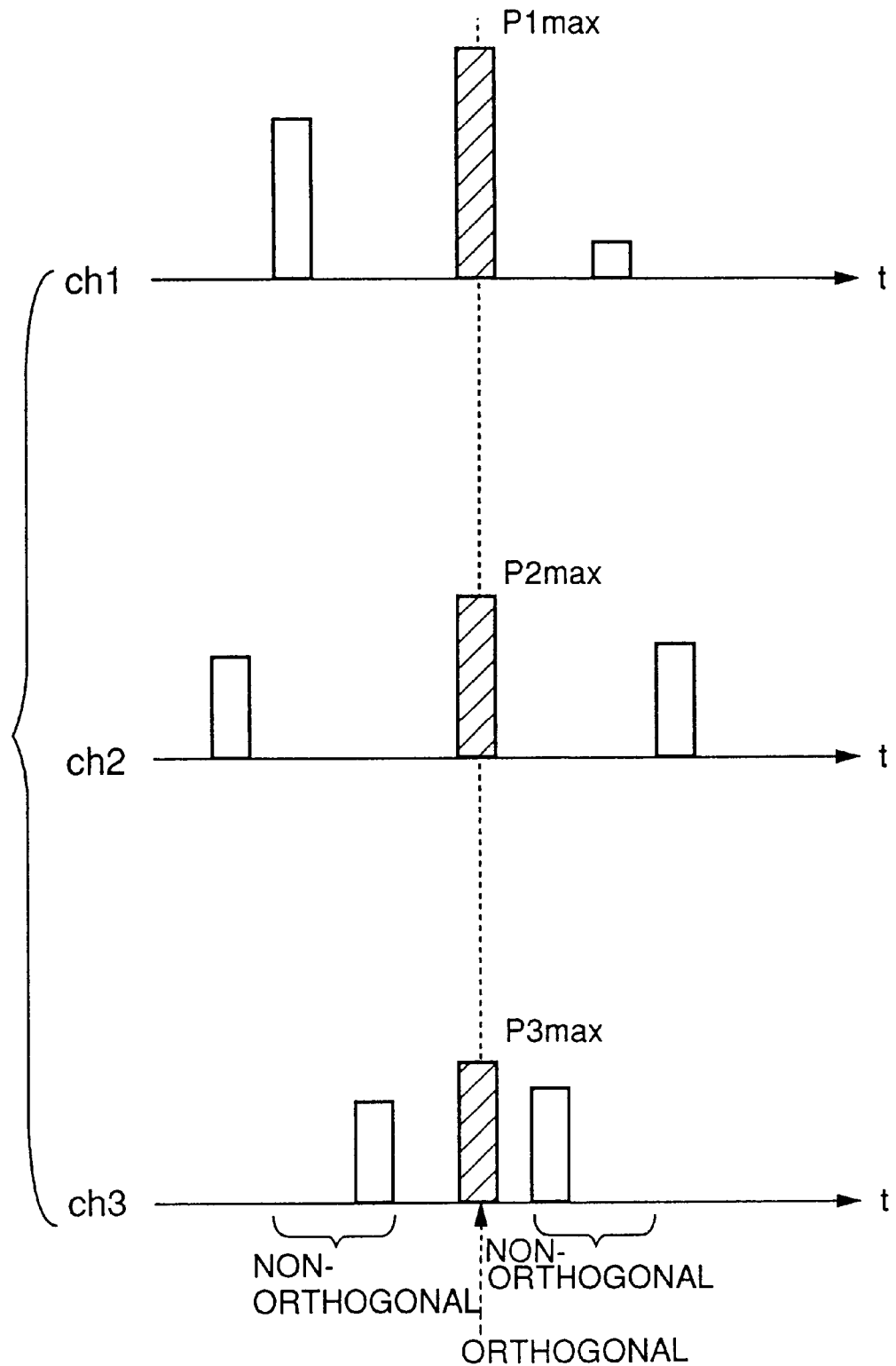
FIG. 7 is a diagram to help explain time alignment control when delay spread has occurred.

Therefore, even when the up-link channel signals sent to the base station BS1 from the mobile stations PS1 to PS3 via the up-link channels ch1, ch2, and ch3 each have delay spread as shown in FIG. 7, for example, the orthogonality between paths P1max, P2max, and P3max with the largest reception level at the base station BS1 is maintained. This enables communication in a state where interference between channels is the smallest.

When the path with the largest reception level is selected, the average value of the reception levels at each path may be sensed and the path with the largest average value be sensed. This produces the following effect. When the moving speed of a mobile station is high, the effect of fading causes the reception level of each path at the base station to fluctuates significantly. As a result, even if the path with the largest reception level is selected with a certain timing, there is a possibility that as time passes, the reception level at another path will get larger, preventing stable timing control. However, by finding the average value of reception levels for each path and selecting the path with the largest average value, more stable timing control can be performed.

As described until now, with the system of the embodiment, on the basis of the correlation value between the orthogonal code included in the up-link channel signals coming from the mobile stations PS1 to PS3 and the orthogonal code generated at the base station BS1, the phase difference sensing circuit 31 of the base station BS1 senses the phase difference between the two orthogonal codes and sends timing control information for bringing the phase difference closer to zero to the mobile stations PS1 to PS3. Then, in each of the mobile stations PS1 to PS3, the transmission timing control circuit 48 variably sets the amount of delay in the delay circuit of the modulation circuit 46 according to the timing control information sent from the base station BS1. This enables delay control of the transmission timing of the transmission signals of the mobile stations PS1 to PS3, thereby maintaining the orthogonality between the up-link channel signals at the base station BS1.

Therefore, the transmission timing of each of the up-link channel signals transmitted from the mobile stations PS1 to PS3 to the base station BS1 undergoes delay adjustment at the mobile stations PS1 to PS3 in advance. As a result, even when the distance from the base station BS1 to each of the mobile stations PS1 to PS3 differs, the up-link channel signal transmitted from each of the mobile stations PS1 to PS3 is received simultaneously by the base station BS1. This enables the correlation value between the orthogonal codes of the individual up-link channel signals received by the base station BS1 to be made zero, achieving high-quality radio compunctions with less interference between channels. Consequently, the channel accommodation capacity can be increased.

Furthermore, in the embodiment, during the radio link negotiation before the start of communication, the phase difference between the reception phase of the orthogonal codes included in the up-link channel signals sent from the mobile stations PS1 to PS3 to the base station BS1 and the phase of the orthogonal code generated at the base station BS1 is sensed. On the basis of the sense result, initial timing control information is created and this information is notified to the mobile stations PS1 to PS3. Then, on the basis of the notified initial timing control information, each of the mobile stations PS1 to PS3 initially sets the amount of delay of transmission timing and from this time on, delays the up-link channel signal with the amount of delay and then transmits the delayed up-link channel signal. Accordingly, high-quality CDMA radio communication without interference between channels can be accomplished without from the start time of communication.

Moreover, even after the communication has been started, a feedback loop of phase control between the base station BS1 and each of the mobile stations PS1 to PS3 is formed. The feedback loop always provides feedback control of the transmission timing of the up-link channel signals transmitted from the mobile stations PS1 to PS3. Consequently, even when the distance between the base station BS1 and the mobile stations PS1 to PS3 has changed because the mobile stations PS1 to PS3 moved during the communication, the phase of the orthogonal code included in each up-link channel signal when the up-link channel signals transmitted from the mobile stations PS1 to PS3 are received by the base station BS1 can be forced to always synchronize with that of another up-link channel signal. This enables high-quality CDMA radio communication with no inter-channel interference without intermission during the communication.

Furthermore, when each of the up-link channel signals sent from the mobile stations PS1 to PS3 to the base station BS1 has multi-path propagation environment, the base station BS1 selects the one with the largest reception level from the paths for each up-link channel. Then, the phase difference between the orthogonal codes of the individual up channels is sensed using the path with the largest reception level. On the basis of the phase difference, the transmission timing of the corresponding mobile station is controlled. Accordingly, even when a delay spread greater than the chip rate of the orthogonal code has occurred on an up-link channel, at least the orthogonality between the paths with the largest reception level that would have the greatest effect on inter-channel interference can be maintained. This enables inter-channel interference to be suppressed effectively, achieving comprehensive high-quality CDMA radio communication.

Moreover, when the path with the largest reception level is selected, the average value of reception levels for each path is sensed. The path with the largest average value is selected and the phase difference is sensed. Accordingly, even when the moving speed of the mobile stations is fast and the reception level of each path is liable to change at the base station because of the influence of fading, the path with the largest reception level can be selected stably, which enables stable timing control.

The effect of the present invention described above will be explained in further detail.

(A) First, an analysis of characteristic will be made

The desired wave to interference wave ratio (CIR) on a given up-link channel is determined for a case where the transmission timing of a mobile station is controlled on the basis of the phase difference between orthogonal codes, that is, for each of the cases where time alignment (TA) is made and not made. The RAKE reception method is used as a reception method.

It is assumed that implementing time alignment causes the paths with the largest reception level to be orthogonal each other and prevents the other paths from be orthogonal. No thermal noise is taken into account and only deterioration by interference is considered.

(A-1) 2-path model

First, the desired wave level will be determined.

If the envelopes of the desired wave after inverse spread are Ri1(path1) and Ri2(path2), the desired wave levels Ci1 and Ci2 after inverse spread will be given by:

$$Ci1 = Ri1^2 \tag{1}$$

$$Ci2 = Ri2^2 \tag{2}$$

Next, an interference wave level without time alignment will be determined.

All the paths excluding its own path of the present channel and all the paths of the other channels produce interference waves. The interference wave levels Ii1 and Ii2 are considered to be multiplied by 1/PG (PG: process gain) as a result of inverse spread and are given by:

$$I_{i1} = \frac{1}{PG}\left(\sum_{a=1}^{n} R_{a2}^2 + \sum_{a \neq i} R_{a1}^2\right) \tag{3}$$

$$I_{i2} = \frac{1}{PG}\left(\sum_{a=1}^{n} R_{a1}^2 + \sum_{a \neq i} R_{a2}^2\right) \tag{4}$$

In contrast, an interference wave level with time alignment is as follows.

The component of interference of the path to be subjected to time alignment differs from that of the other paths. Because the path to be subjected to time alignment is at right angles to the paths to be subjected to time alignment on other channels, the former does not interfere with the latter. The former interferes only with the paths not to be subjected to time alignment. The degree of interference with the paths not to be subjected to time alignment is the same as when time alignment is not carried out.

Since a relative amount of delay for each path is not considered, the order in which numbers are assigned to the paths is arbitrary and the following expression can be given:

Ri1>Ri2

If the path of Ri1 is subjected to time alignment to align the reception timing at the base station, the interference wave levels Ii1 and Ii2 will be given by:

$$I_{iI} = \frac{1}{PG}\sum_{a=1}^{n} R_{a2}^2 \tag{5}$$

$$I_{i2} = \frac{1}{PG}\left(\sum_{a=1}^{n} R_{aI}^2 + \sum_{a \neq i} R_{a2}^2\right) \tag{6}$$

The difference between equation (3) and equation (5) is the effect of reducing interference by the time alignment.

The RAKE reception produces the following effect. It is assumed that the largest ratio combination of path 1 and path 2 is made by the RAKE reception. Because the desired wave level is the electric power of the signal obtained by combining the voltages of the individual weighted paths and the interference wave level is the sum of the electric power of each weighted path, the desired wave to interference wave ratio γi after the combination is give by:

$$\gamma_i = \frac{(R_{iI}^2 + R_{i2}^2)^2}{R_{iI}^2 I_{iI} + R_{i2}^2 I_{i2}} \tag{7}$$

(A-2) n-path model

As compared with the 2-path model, the n-path model has more paths that cause interference. If the number of paths is m and the envelope of path j on channel i after inverse spread is Rij, the desired wave level Cij, the interference wave level Iij without time alignment, and the interference wave level Iij with time alignment will be expressed as:

Desired Wave Level $C_{ij}$ $$C_{ij} = R_{ij}^2 \tag{8}$$

Interference Wave Level (without TA) $I_{ij}$ $$I_{ij} = \frac{1}{PG}\left(\sum_{b \neq j}\sum_{a=1}^{n} R_{ab}^2 + \sum_{a \neq i} R_{aj}^2\right) \tag{9}$$

Interference Wave Level (with TA) $I_{ij}$ $$R_{iI} = MAX[Ria, a = 1, 2, \cdots, m]$$

$$I_{iI} = \frac{1}{PG}\sum_{b=j}\sum_{a=1}^{n} R_{ab}^2 \tag{10}$$

$$I_{ij} = \frac{1}{PG}\left(\sum_{b \neq j}\sum_{a=1}^{n} R_{ab}^2 + \sum_{a \neq i} R_{aj}^2\right) \tag{11}$$
$$(j \neq 1)$$

where $R_{i1} = MAX[R_{ia}, a=1, 2, \ldots, m]$

As seen from the comparison of equation (9) with equation (10), when the number of paths increases with the distribution of $R_{ij}$ remaining constant, the effect of time alignment is expected to decrease.

Even with the n-path model, the RAKE reception produces the following effect. If RAKE reception is implemented to achieve the largest ratio combination of all paths, the CIR γi after the largest ratio combination will be given by the following equation:

$$\gamma_i = \frac{\left(\sum_{b=1}^{m} R_{ib}^2\right)^2}{\sum_{b=1}^{m} R_{ib}^2 I_{ib}} \tag{12}$$

(B) Next, characteristic evaluation will be made

The system capacity with time alignment will be compared with the system capacity without time alignment.

A bit error rate (BER) will be determined, provided that the modulation scheme is QPSK and the demodulation scheme is synchronous detection. If the reception CNR is γ, the code error rate Pe of QPSK synchronous detection will be given by:

$$Pe = \frac{1}{2}erfc\left(\sqrt{\frac{\gamma}{2}}\right) \tag{13}$$

Where erfc $$erfc\left(\sqrt{\frac{\gamma}{2}}\right)$$

is a complementary error function.

With the system of the embodiment, because interference can be regarded as noise, then γ=CIR.

If $R_{ij}$ follows any distribution, the desired wave level, the interference wave level without time alignment, and the interference wave level with time alignment can be determined using equation (8) to equation (11). The CIR in RAKE reception can be found using equation (12). Substituting the CIR into equation (13) gives BER in RAKE reception.

For propagation models, (a) an equal-gain 2-path Rayleigh model, (b) an equal-gain 3-path Rayleigh model, and (c) an equal-gain 4-path Rayleigh model are used.

In the CDMA scheme, transmission power control (TPC) has a great effect on the capacity, so the following three cases will be considered:

CASE 1: a case where TPC compensates only distance variations and shadowing variations CASE 2: a case where TPC also compensates Rayleigh variations In the CASE 2, the sum of the reception power of all the paths of the desired wave is controlled to a constant value, or is controlled so that the following equation may hold:

$$\sum_{b=1}^{m} R_{ib}^2 = 1 \tag{14}$$

Figure 8:
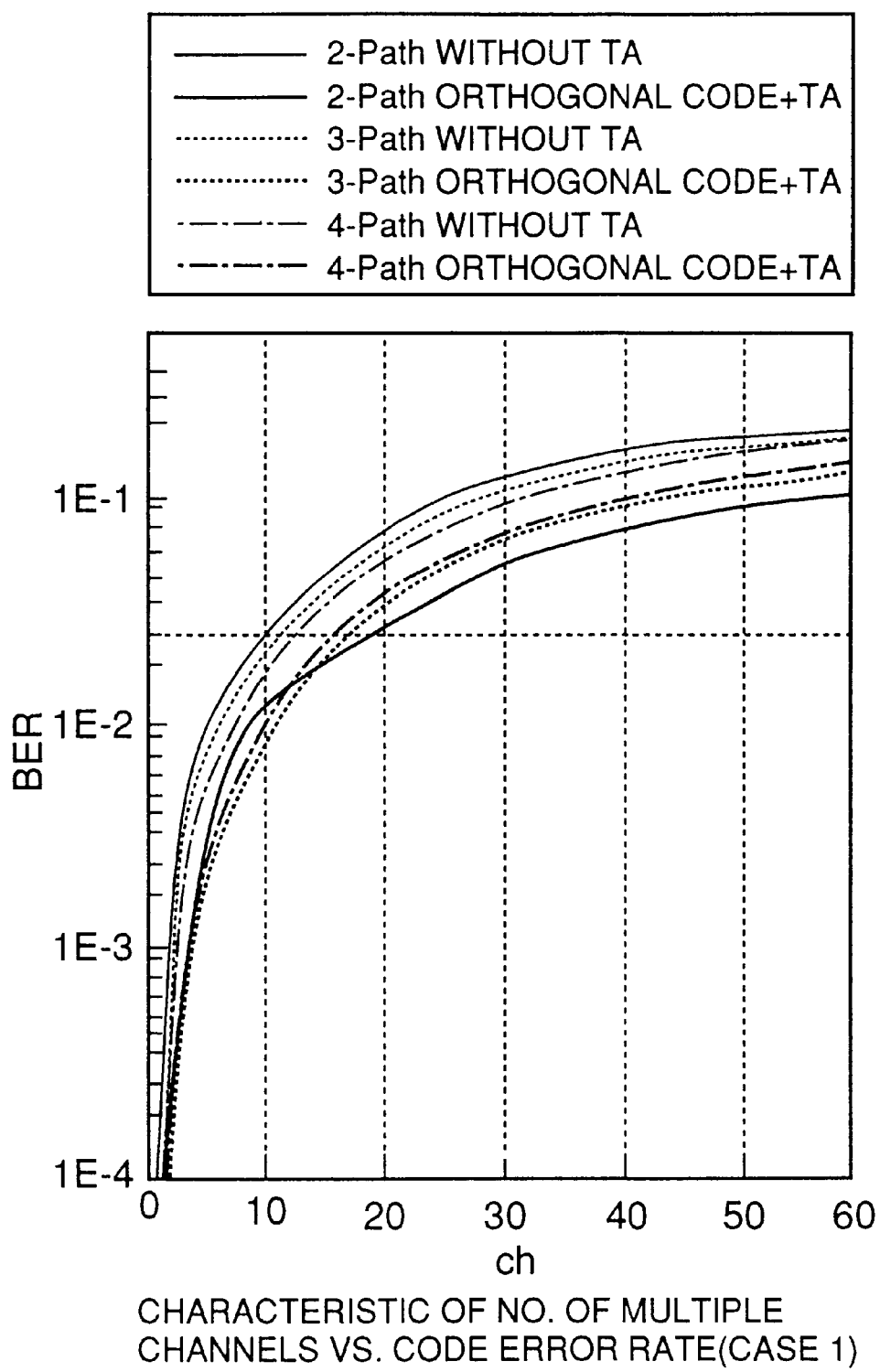
FIG. 8 is a characteristic diagram of the relationship between the number of multiple channels and the bit error rate when transmission power control compensates only distance variations and shadowing variations.
Figure 9:
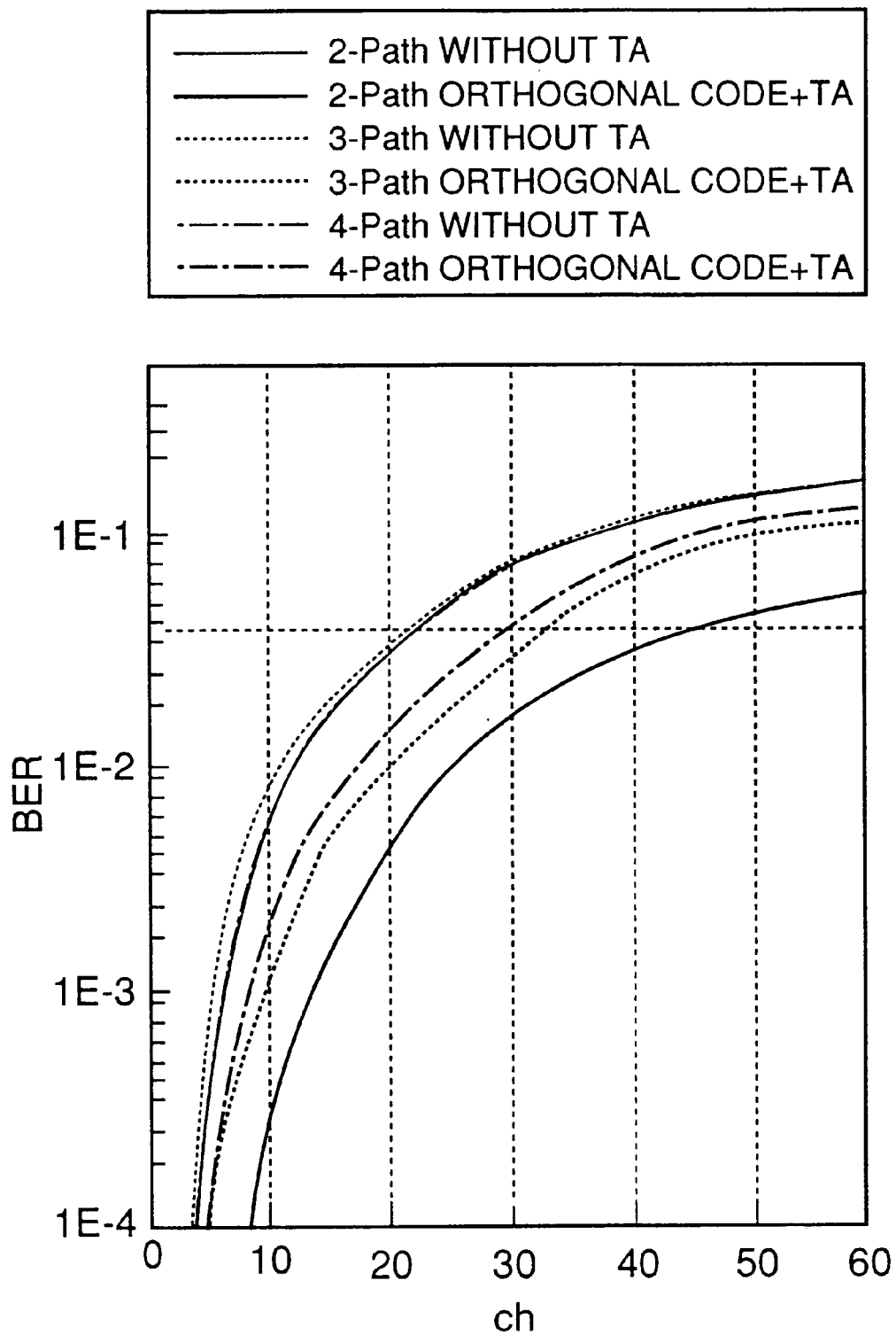
FIG. 9 is a characteristic diagram of the relationship between the number of multiple channels and the bit error rate when transmission power control also compensates Rayleigh variations.

The relationship between the number of multiple channels and the error rate in CASE 1 is shown in FIG. 8. The relationship between the number of multiple channels and the error rate in CASE 2 is shown in FIG. 9. In both cases, PG=64.

Using the number of multiple channels with BER=3×10⁻² as the system capacity, the table in FIG. 10 is created. As seen from FIG. 10, the comparison of the case using time alignment with the case not using time alignment shows that the equal-gain 2-path Rayleigh model achieves a capacity about twice as large as the original system capacity, the equal-gain 3-path Rayleigh model achieves a capacity about ⅔ times as large as the original system capacity, and the equal-gain 4-path Rayleigh model achieves a capacity about ⅘ times as large as the original system capacity.

As described so far, the interference reducing method of the present invention can increase the system capacity to a value about twice the original system capacity.

The method of the present invention has the following error-generating factor. As shown in FIG. 4, the time alignment (TA) method of the present invention is such that the value of the phase shift of the orthogonal codes between multiple channels is sensed at the base station BS1 and timing control information corresponding to the value is notified to the mobile stations PS1 to PS3 and that each of the mobile stations PS1 to PS3 controls the transmission timing of the up-link channel signal on the basis of the notified timing control information. Specifically, a control loop for time alignment is formed between the base station BS1 and the mobile stations PS1 to PS3. This results in a time lag between the sensing action and the control action. Variations in the propagation distance during that time make control errors.

The amount of characteristic deterioration with respect to time alignment errors in the method of the present invention is evaluated. Specifically, when the phase of the orthogonal code has shifted one chip or more, the correlation value deteriorates seriously, making it meaningless to use orthogonal codes. For this reason, to evaluate the effect of errors, the effect of the phase shift less than one chip is evaluated. In the evaluation, the effect of a waveform shaping filter must be taken into account. To do this, evaluation is made by simulation. It is assumed that evaluation is carried out in the equal-gain 2-path Rayleigh environment that produces an especially great effect by the method of the present invention. FIG. 11 shows simulation conditions.

Figure 12:
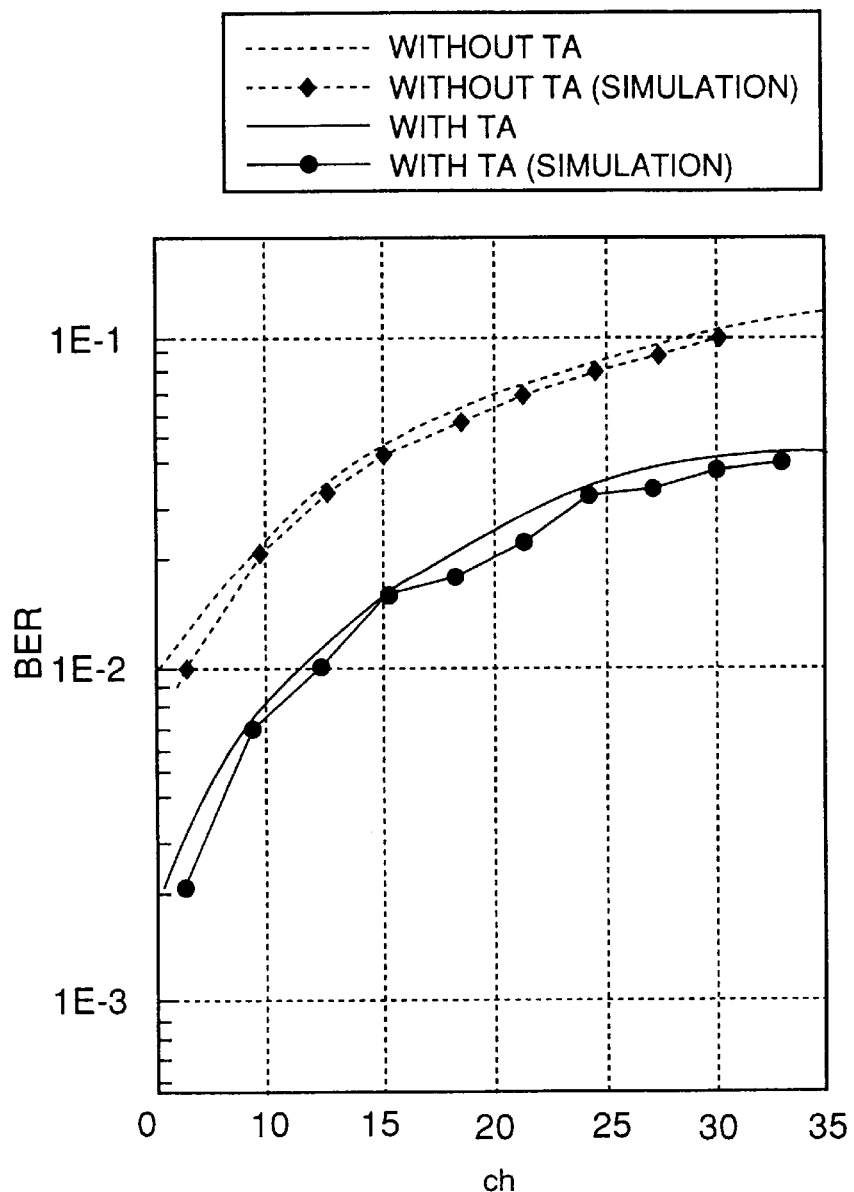
FIG. 12 is a characteristic diagram of the relationship between the number of multiple channels and the bit error rate with time alignment and without time alignment.

First, the aforementioned analysis result is compared with the simulation result. FIG. 12 is a characteristic diagram of the number of multiple channels versus BER for a case with time alignment and a case without time alignment. As seen from FIG. 12, the analysis result almost synchronizes with the simulation result. The BER of the simulation result is slightly lower. One reason is that in simulation, the range of relative delay is finite and there is a possibility that paths not to be subjected to time alignment will also orthogonalize. Another reason is that the inserted waveform shaping filter has an effect on the BER.

Figure 13:
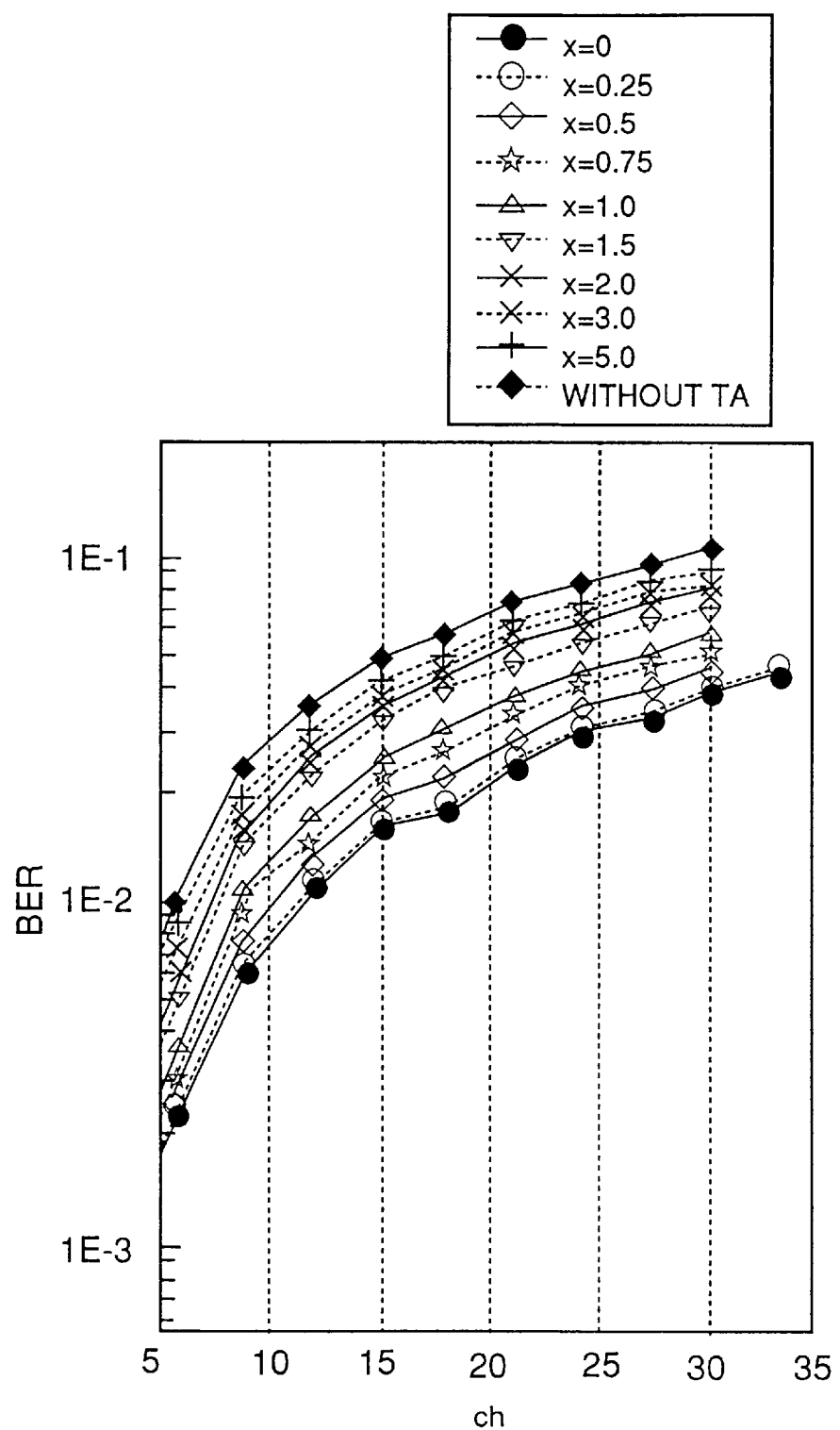
FIG. 13 is a characteristic diagram of the relationship between the number of multiple channels and the bit error rate when time alignment error x is changed.

In time alignment errors, a case where reception timing is distributed uniformly between 0 to x chip is determined to be error x chip. FIG. 13 is a characteristic diagram of the number of multiple channels versus BER when time alignment error x is changed. As shown in FIG. 13, as time alignment error x gets larger, the BER deteriorates more.

Figure 14:
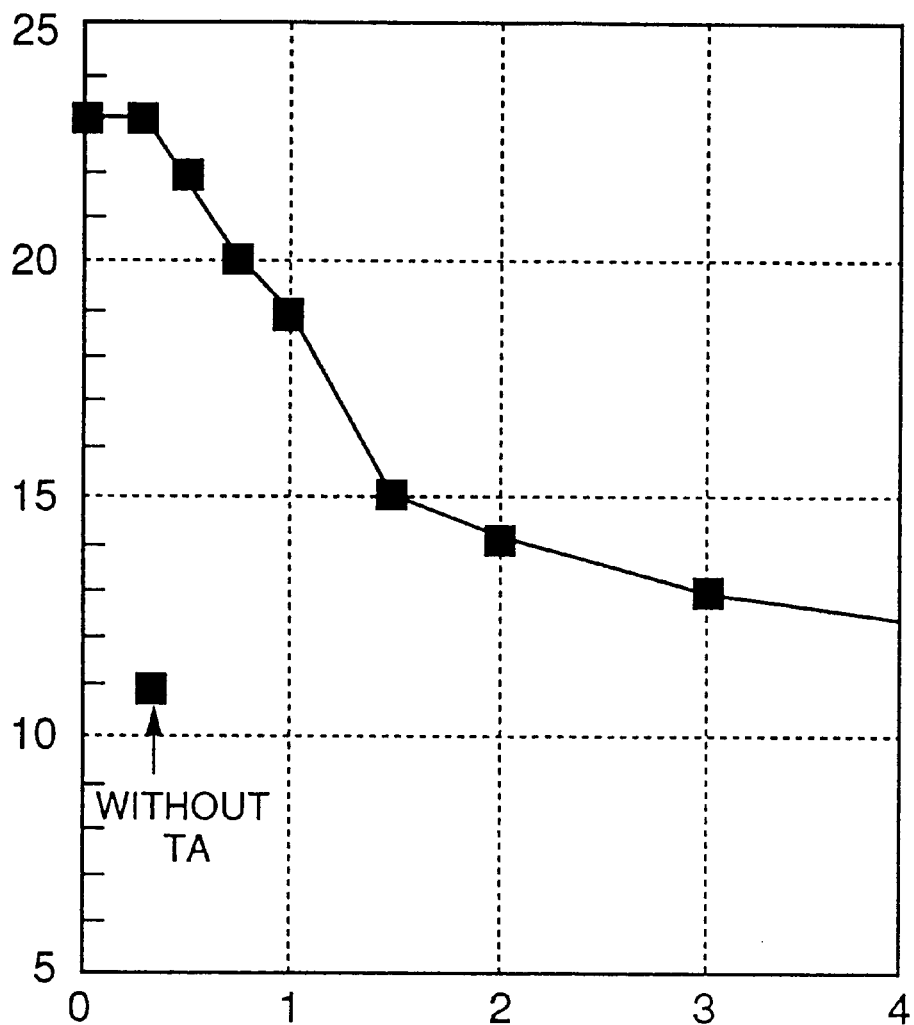
FIG. 14 is a diagram of how the system capacity decreases as the time alignment error x increases.
Figure 15:
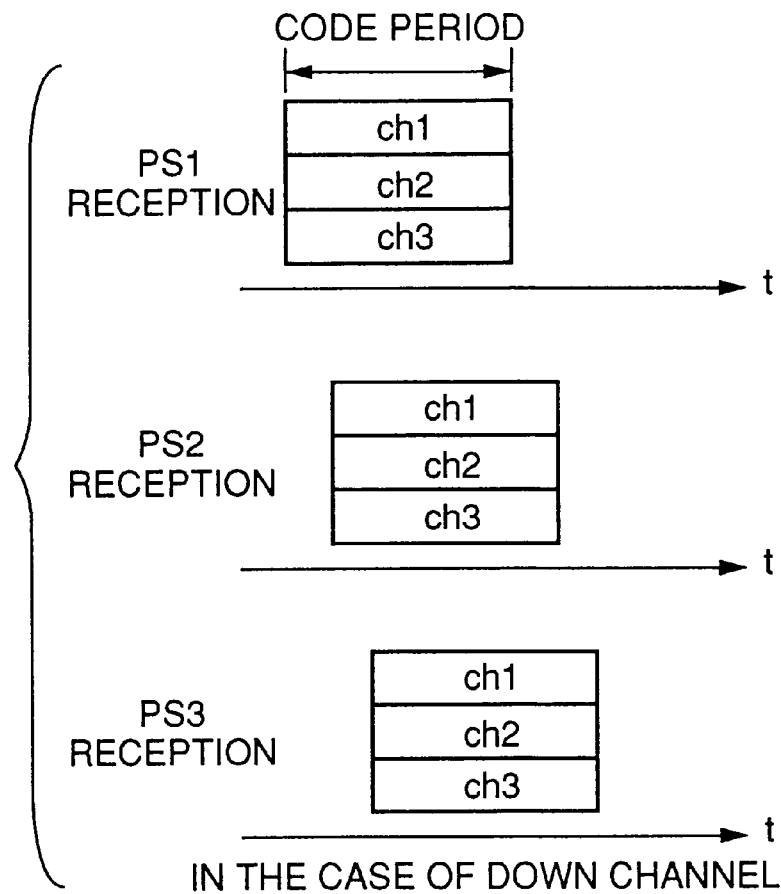
FIG. 15 shows the reception timing of the mobile station on the down-link channel.
Figure 16:
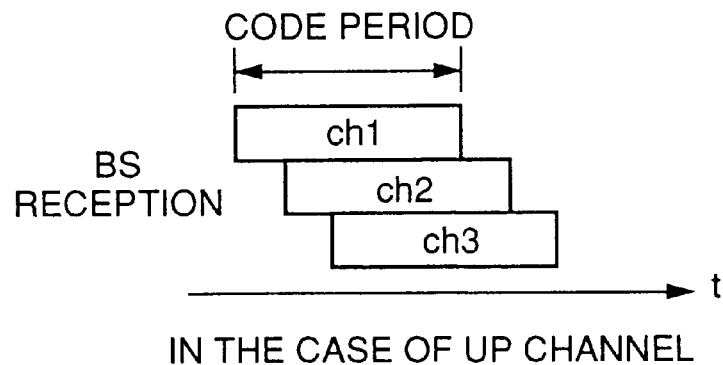
FIG. 16 is the reception timing of the base station on the up-link channel.

FIG. 14 shows how the system capacity (the number of multiple channels with BER=$3 \times 10^{-2}$) decreases as time alignment error x increases. FIG. 14 also shows the system capacity without time alignment.

As seen from FIG. 14, the decrease of the system capacity can hardly be seen up to a time alignment error of 0.5 chip, as compared with a capacity of 23 channels with a time alignment error of zero chip. When the time alignment error has reached one chip, the system capacity is 19 channels, about a 20%-drop. This system capacity is more than 1.7 times as large as a system capacity of 11 channels without time alignment, proving that use of the method of the present invention produces a sufficient effect.

When a time alignment error has exceeded one chip, the system capacity deteriorates rapidly as expected from the correlation characteristic of orthogonal codes, bringing the characteristic to one without time alignment.

The present invention is not limited to the above embodiment, but may be practiced or embodied in still other ways without departing from the spirit or essential character thereof. For instance, the timing control information that the base station notifies to the mobile stations may be the phase difference sense value sensed at the base station or the phase difference control amount created on the basis of the phase difference sense value.

Furthermore, in the case where a mobile station is used as a fixed station, or in the case of a mobile station the propagation distance from which to the base station remains almost unchanged even when the mobile station has moved, because the moving range is limited to a very small area, for example, the maintenance man may measure the amount of propagation delay at the beginning of use and enter and set the measurement result in the mobile station. In this case, the timing control information receiving means and transmission timing control means of the mobile station are not necessary.

While in the embodiment, explanation has been given using a mobile communication system, the present invention is not limited to the mobile communication system. For instance, the invention may be applied to a cable communication system, such as a CATV system. Specifically, in a CATV system, a plurality of subscriber's stations (terminal stations) are connected to, for example, a broadcasting station (base station), called a head end, in tree form or star form via coaxial lines or optical fiber lines. Then, the base station transmits a broadcasting signal to the individual terminal stations via down-link channels. Each terminal unit transmits control data items, including a broadcasting program select signal, to the base station via an up-link channel.

In the CATV system, the transmission distance from the base station to each terminal station differs from one terminal station to another. Because of this, when each terminal channel subjects the up-link channel signal to spectrum spread using orthogonal codes, the orthogonality of the orthogonal codes cannot be maintained between the individual up-link channel signals at the base station.

To overcome this problem, the base station senses the phase difference between the orthogonal codes of the up-link channel signals coming from the individual terminal stations, creates a timing control signal for compensating the phase difference closer to zero, and transmits the timing control signal to the terminal stations. On the basis of the timing control information sent from the basis station to each terminal station, the terminal station performs delay control of the transmission timing of its up-link channel signal.

By doing this, the orthogonality between the up-link channel signals transmitted from the individual terminal stations can be maintained, which makes it possible to reduce inter-channel interference and increase the subscriber accommodation capacity.

Furthermore, the configuration of the system, the configuration of the mobile station, the configuration of the base station, the procedure for controlling the transmission timing of the up-link channel signal, and the contents of the procedure may be practiced or embodied in still other ways without departing from the spirit or essential character of the present invention.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

I claim:

1. A CDMA communication system comprising:

a base station that transmits a down-link channel signal to a specific radio area; and a plurality of mobile stations that receive the down-link channel signal transmitted from the base station and subject up-link channel signals to spectrum spread using orthogonal codes and then transmit the resulting signals to the base station, wherein said base station comprises:

sensing means for sensing a phase difference between a reception phase of the orthogonal code of the up-link channel signal received by said base station and a reference phase generated by said base station, wherein when each of the up-link channel signals coming from the mobile stations has a plurality of paths, said sensing means selects the path where the reception level is the largest from the plurality of paths for each up-link channel signal and then senses the phase difference between the reception phase of the selected paths and the reference phase; and notifying means for creating timing control information for bringing the phase difference sensed by the sensing means closer to zero and notifying the timing control information to the relevant mobile station; and each of said plurality of mobile stations comprises:

control information reception means for receiving the timing control information notified by said base station; and transmission timing control means for controlling the transmission timing of an up-link channel signal transmitted to said base station according to the timing control information received by said control information reception means.

2. A CDMA communication system according to claim 1, wherein said base station senses said phase difference and notifies said timing control information to a mobile station in a period of negotiation made to establish a radio link with the mobile station before the start of communication, and each of said plurality of mobile stations performs delay control of the transmission timing of an up-link channel signal on the basis of the timing control information notified by said base station in said negotiation period.

3. A CDMA communication system according to claim 1, wherein said base station senses said phase difference and notifies the timing control information to a mobile station during a communication period, and each of said plurality of mobile stations performs delay control of the transmission timing of an up-link channel signal during said communication period on the basis of the timing control information notified by said base station.

4. A CDMA communication system according to claim 1, wherein said base station senses said phase difference and notifies said timing control information to a mobile station in a period of negotiation made to establish a radio link with the mobile station before the start of communication and in a communication period, and each of said plurality of mobile stations initially sets the transmission timing of an up-link channel signal on the basis of the timing control information notified by said base station in said negotiation period and corrects the transmission timing of the up-link channel signal on the basis of the timing control information notified by said base station in said communication period.

5. In a CDMA communication system including a base station that transmits a down-link channel signal to a specific radio area and a plurality of mobile stations that receive the down-link channel signal transmitted from the base station and subject up-link channel signals to spectrum spread using orthogonal codes and then transmit the resulting signals to the base station, a radio communication apparatus used as said base station, comprising:

sensing means for sensing a phase difference between a reception phase of the orthogonal code of the up-link channel signal received by said base station and a reference phase generated by said base station, wherein when each of the uplink channel signals coming from the mobile stations has a plurality of paths, said sensing means selects the path where the reception level is the largest from the plurality of paths for each up-link channel signal and then senses the phase difference between the reception phase of the selected paths and the reference phase; and timing information notifying means for creating timing control information for bringing the phase difference sensed by the sensing means closer to zero and notifying the timing control information to the relevant mobile station to force the mobile station to control the transmission timing of the up-link channel signal on the basis of the timing control information.

6. In a CDMA communication system including a base station that transmits a down-link channel signal to a specific service area and a plurality of terminal stations that are connected to said base station via communication channels in the service area covered by said base station and that each subject an up-link channel signal to spectrum spread using orthogonal codes and then transmit the resulting signal to said base station, said base station comprising:

sensing means for sensing a phase difference between a reception phase of the orthogonal code of the up-link channel signal received by said base station and a reference phase generated by said base station, wherein when each of the up-link channel signals coming from the terminal stations has a plurality of paths, said sensing means selects the path where the reception level is the largest from the plurality of paths for each up-link channel signal and then senses the phase difference between the reception phase of the selected paths and the reference phase; and notifying means for creating timing control information for bringing the phase difference sensed by the sensing means closer to zero and notifying the timing control information to the relevant terminal station; and each of said plurality of terminal stations comprising:

control information reception means for receiving the timing control information notified by said base station; and transmission timing control means for controlling the transmission timing of an up-link channel signal transmitted to said base station according to the timing control information received by said control information reception means.

7. In a CDMA communication system including a base station that transmits a down-link channel signal to a specific service area and a plurality of terminal stations that receive the down-link channel signal transmitted from the base station and subject up-link channel signals to spectrum spread using orthogonal codes and then transmit the resulting signals to the base station, a radio communication apparatus used as said base station, comprising:

sensing means for sensing a phase difference between a reception phase of the orthogonal code of the up-link channel signal received by said base station and a reference phase generated by said base station, wherein when each of the up-link channel signals coming from the terminal stations has a plurality of paths, said sensing means selects the path where the reception level is the largest from the plurality of paths for each up-link channel signal and then senses the phase difference between the reception phase of the selected paths and the reference phase; and timing information notifying means for creating timing control information for bringing the phase difference sensed by the sensing means closer to zero and notifying the timing control information to the relevant terminal station to force the terminal station to control the transmission timing of the up-link channel signal on the basis of the timing control information.

8. A CDMA communication system comprising:

a base station that transmits a down-link channel signal to a specific radio area; and a plurality of mobile stations that receive the down-link channel signal transmitted from the base station and subject up-link channel signals to spectrum spread using orthogonal codes and then transmit the-resulting signals to the base station, wherein said base station comprises:

sensing means for sensing a phase difference between a reception phase of the orthogonal code of the up-link channel signal received by said base station and a reference phase generated by said base station, wherein when each of the up-link channel signals coming from the mobile stations has a plurality of paths, said sensing means selects the path where the average value of the reception levels is the largest from the plurality of paths for each up-link channel signal and then senses the phase difference between the reception phase of the selected paths and the reference phase; and notifying means for creating timing control information for bringing the phase difference sensed by the sensing means closer to zero and notifying the timing control information to the relevant mobile station; and each of said plurality of mobile stations comprises:

control information reception means for receiving the timing control information notified by said base station; and transmission timing control means for controlling the transmission timing of an up-link channel signal transmitted to said base station according to the timing control information received by said control information reception means.

9. A CDMA communication system according to claim 8, wherein said base station senses said phase difference and notifies said timing control information to a mobile station in a period of negotiation made to establish a radio link with the mobile station before the start of communication, and each of said plurality of mobile stations performs delay control of the transmission timing of an up-link channel signal on the basis of the timing control information notified by said base station in said negotiation period.

10. A CDMA communication system according to claim 8, wherein said base station senses said phase difference and notifies the timing control information to a mobile station during a communication period, and each of said plurality of mobile stations performs delay control of the transmission timing of an up-link channel signal during said communication period on the basis of the timing control information notified by said base station.

11. A CDMA communication system according to claim 8, wherein said base station senses said phase difference and notifies said timing control information to a mobile station in a period of negotiation made to establish a radio link with the mobile station before the start of communication and in a communication period, and each of said plurality of mobile stations initially sets the transmission timing of an up-link channel signal on the basis of the timing control information notified by said base station in said negotiation period and corrects the transmission timing of the up-link channel signal on the basis of the timing control information notified by said base station in said communication period.

12. In a CDMA communication system including a base station that transmits a down-link channel signal to a specific radio area and a plurality of mobile stations that receive the down-link channel signal transmitted from the base station and subject up-link channel signals to spectrum spread using orthogonal codes and then transmit the resulting signals to the base station, a radio communication apparatus used as said base station, comprising:

sensing means for sensing a phase difference between a reception phase of the orthogonal code of the up-link channel signal received by said base station and a reference phase generated by said base station, wherein when each of the up-link channel signals coming from the mobile stations has a plurality of paths, said sensing means selects the path where the average value of the reception levels is the largest from the plurality of paths for each up-link channel signal and then senses the phase difference between the reception phase of the selected paths and the reference phase; and timing information notifying means for creating timing control information for bringing the phase difference sensed by the sensing means closer to zero and notifying the timing control information to the relevant mobile station to force the mobile station to control the transmission timing of the up-link channel signal on the basis of the timing control information.

13. In a CDMA communication system including a base station that transmits a down-link channel signal to a specific service area and a plurality of terminal stations that are connected to said base station via communication channels in the service area covered by said base station and that each subject an up-link channel signal to spectrum spread using orthogonal codes and then transmit the resulting signal to said base station, said base station comprising:

sensing means for sensing a phase difference between a reception phase of the orthogonal code of the up-link channel signal received by said base station and a reference phase generated by said base station, wherein when each of the up-link channel signals coming from the terminal stations has a plurality of paths, said sensing means selects the path where the average value of the reception levels is the largest from the plurality of paths for each up-link channel signal and then senses the phase difference between the reception phase of the selected paths and the reference phase; and notifying means for creating timing control information for bringing the phase difference sensed by the sensing means closer to zero and notifying the timing control information to the relevant terminal station; and each of said plurality of terminal stations comprising:
control information reception means for receiving the timing control information notified by said base station; and
transmission timing control means for controlling the transmission timing of an up-link channel signal transmitted to said base station according to the timing control information received by said control information reception means.

14. In a CDMA communication system including a base station that transmits a down-link channel signal to a specific service area and a plurality of terminal stations that receive the down-link channel signal transmitted from the base station and subject up-link channel signals to spectrum spread using orthogonal codes and then transmit the resulting signals to the base station, a radio communication apparatus used as said base station, comprising:

sensing means for sensing a phase difference between a reception phase of the orthogonal code of the up-link channel signal received by said base station and a reference phase generated by said base station, wherein when each of the up-link channel signals coming from the terminal stations has a plurality of paths, said sensing means selects the path where the average value of the reception levels is the largest from the plurality of paths for each up-link channel signal and then senses the phase difference between the reception phase of the selected paths and the reference phase; and timing information notifying means for creating timing control information for bringing the phase difference sensed by the sensing means closer to zero and notifying the timing control information to the relevant terminal station to force the terminal station to control the transmission timing of the up-link channel signal on the basis of the timing control information.

* * * * *